(12) United States Patent
Kageyama et al.

(10) Patent No.: US 10,780,851 B2
(45) Date of Patent: Sep. 22, 2020

(54) POWER SOURCE DEVICE AND VEHICLE EQUIPPED WITH POWER SOURCE DEVICE

(71) Applicant: Panasonic Intellectual Property Management Co., Ltd., Osaka (JP)

(72) Inventors: Youichi Kageyama, Fukushima (JP); Takashi Higashide, Fukushima (JP); Katsunori Atago, Fukushima (JP); Yugo Setsu, Fukushima (JP); Hisao Hiragi, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 72 days.

(21) Appl. No.: 16/322,543

(22) PCT Filed: Sep. 15, 2017

(86) PCT No.: PCT/JP2017/033385
§ 371 (c)(1),
(2) Date: Feb. 1, 2019

(87) PCT Pub. No.: WO2018/056190
PCT Pub. Date: Mar. 29, 2018

(65) Prior Publication Data
US 2019/0184921 A1  Jun. 20, 2019

(30) Foreign Application Priority Data
Sep. 20, 2016 (JP) .................................. 2016-182495

(51) Int. Cl.
*B60R 16/033* (2006.01)
*B60L 50/50* (2019.01)
(Continued)

(52) U.S. Cl.
CPC .............. *B60R 16/033* (2013.01); *B60L 7/10* (2013.01); *B60L 50/50* (2019.02); *B60R 21/017* (2013.01);
(Continued)

(58) Field of Classification Search
CPC ..... B60R 16/033; B60R 21/017; B60L 50/50; B60L 7/10; H02J 9/06; H02J 7/00;
(Continued)

(56) References Cited

U.S. PATENT DOCUMENTS

| | | | |
|---|---|---|---|
| 2015/0001926 A1* | 1/2015 | Kageyama | E05B 81/86 307/10.1 |
| 2018/0215371 A1* | 8/2018 | Tajima | H02J 7/0029 |
| 2019/0165602 A1* | 5/2019 | Morita | F16H 59/08 |

FOREIGN PATENT DOCUMENTS

WO    2013/125170    8/2013

OTHER PUBLICATIONS

International Search Report of PCT application No. PCT/JP2017/033385 dated Oct. 31, 2017.

* cited by examiner

*Primary Examiner* — Arnold M Kinkead
(74) *Attorney, Agent, or Firm* — McDermott Will & Emery LLP

(57) ABSTRACT

A power source device of present disclosure includes: a first power storage element; a second power storage element that is connected in parallel to the first power storage element and that has a lower internal resistance than an internal resistance of the first power storage element and a lower storage capacity than a storage capacity of the first power storage element; an opening and closing part that is connected between the first power storage element and the second power storage element and that switches between a disconnection state and a connection state; a charge circuit
(Continued)

that is connected to an input route of the first power storage element and that performs a step-down operation; a discharge circuit that is connected to an output route of the second power storage element and that performs a step-up operation; and a controller that controls operations of the opening and closing part, the charge circuit, and the discharge circuit.

9 Claims, 5 Drawing Sheets

(51) Int. Cl.
| | |
|---|---|
| *H02J 9/06* | (2006.01) |
| *E05B 81/86* | (2014.01) |
| *B60R 21/017* | (2006.01) |
| *H02J 7/00* | (2006.01) |
| *H01M 2/10* | (2006.01) |
| *H02J 7/34* | (2006.01) |
| *H01M 10/44* | (2006.01) |
| *B60L 7/10* | (2006.01) |
| *B60W 10/26* | (2006.01) |

(52) U.S. Cl.
CPC .............. *B60W 10/26* (2013.01); *E05B 81/86* (2013.01); *H01M 2/10* (2013.01); *H01M 10/44* (2013.01); *H02J 7/00* (2013.01); *H02J 7/0063* (2013.01); *H02J 7/345* (2013.01); *H02J 9/06* (2013.01); *H02J 9/061* (2013.01)

(58) Field of Classification Search
CPC . H02J 7/34; E05B 81/86; H01M 2/10; H01M 10/44; B60W 10/26
USPC .... 320/133, 134, 166; 307/9.1, 10.1, 11, 45, 307/46
See application file for complete search history.

POWER SOURCE DEVICE AND VEHICLE EQUIPPED WITH POWER SOURCE DEVICE

CROSS-REFERENCE TO RELATED APPLICATIONS

This application is a U.S. national stage application of the PCT International Application No. PCT/JP2017/033385 filed on Sep. 15, 2017, which claims the benefit of foreign priority of Japanese patent application No. 2016-182495 filed on Sep. 20, 2016, the contents all of which are incorporated herein by reference.

TECHNICAL FIELD

The present disclosure relates to a power source device to be used for various vehicular electronic devices and to a vehicle equipped with the power source device.

BACKGROUND ART

Conventional power source device 1 will be described below with reference to the drawings. FIG. 5 is a block diagram illustrating a configuration of conventional power source device 1. Power source device 1 includes power storage element 2, charge circuit 3, discharge circuit 4, and control circuit 5. Charge circuit 3 is connected to an input route of power storage element 2, and discharge circuit 4 is connected to an output route of power storage element 2. Control circuit 5 controls operations of charge circuit 3 and discharge circuit 4.

When charging power storage element 2 with electric power from an outside of power source device 1, control circuit 5 activates charge circuit 3 and inactivates discharge circuit 4. When discharging the electric power stored in power storage element 2, control circuit 5 inactivates charge circuit 3 and activates discharge circuit 4.

For example, PTL 1 is known as information on prior art documents related to the present disclosure.

CITATION LIST

Patent Literature

PTL 1: WO2013/125170

SUMMARY OF THE INVENTION

According to one aspect of the present disclosure, a power source device includes: a first power storage element; a second power storage element that is connected in parallel to the first power storage element, the second power storage element having a lower internal resistance than an internal resistance of the first power storage element and a lower storage capacity than a storage capacity of the first power storage element; an opening and closing part that is connected between the first power storage element and the second power storage element, the opening and closing part switching between a disconnection state and a connection state; a charge circuit that is connected to an input route of the first power storage element, the charge circuit performing a step-down operation; a discharge circuit that is connected to an output route of the second power storage element, the discharge circuit performing a step-up operation; and a controller that controls operations of the opening and closing part, the charge circuit, and the discharge circuit. When the opening and closing part is in the disconnection state, the first power storage element is disconnected from the second power storage element, the charge circuit performs the step-down operation to charge the first power storage element, and the discharge circuit stops operating. The discharge circuit stops operating over a predetermined time after the opening and closing part has switched from the disconnection state to the connection state. After the predetermined time has passed since switching of the opening and closing part from the disconnection state to the connection state, the discharge circuit starts the step-up operation to discharge electric power stored in the second power storage element and the first power storage element.

According to one aspect of the present disclosure, a vehicle includes: a vehicle body; a vehicle battery disposed in the vehicle body; a door disposed in the vehicle body; an operation member disposed in the door; a power source device that includes a first power storage element, a second power storage element that is connected in parallel to the first power storage element and that has a lower internal resistance than an internal resistance of the first power storage element and a lower storage capacity than a storage capacity of the first power storage element, an opening and closing part that is connected between the first power storage element and the second power storage element and that switches between a disconnection state and a connection state, a charge circuit that is connected to an input route of the first power storage element and that performs a step-down operation, a discharge circuit that is connected to an output route of the second power storage element and that performs a step-up operation, and a controller that controls operations of the opening and closing part, the charge circuit, and the discharge circuit, the power source device being disposed in the vehicle body; an engine switch connected between the vehicle battery and an input end of the charge circuit; a power route that connects the vehicle battery to an output terminal of the discharge circuit; and a vehicle load that is connected to the output terminal and that is disposed in the vehicle body. In response to an operation of the operation member, the controller switches the opening and closing part from the disconnection state to the connection state. After a predetermined time has passed since switching of the opening and closing part from the disconnection state to the connection state, the discharge circuit starts the step-up operation to supply the vehicle load with electric power stored in the second power storage element and the first power storage element.

According to another aspect of the present disclosure, in the vehicle, the controller or the charge circuit further determines whether the vehicle body is in a normal state or in an abnormal state. When vehicle body is determined to be in the abnormal state and the operation member is operated, the controller sets the opening and closing part to the connection state, and the discharge circuit performs the step-up operation to discharge the electric power stored in the second power storage element and the first power storage element. The electric power is supplied from the discharge circuit to the vehicle load.

DESCRIPTION OF EMBODIMENTS

A first exemplary embodiment of the present disclosure will be described below with reference to the accompanying drawings.

First Exemplary Embodiment

Figure 5:
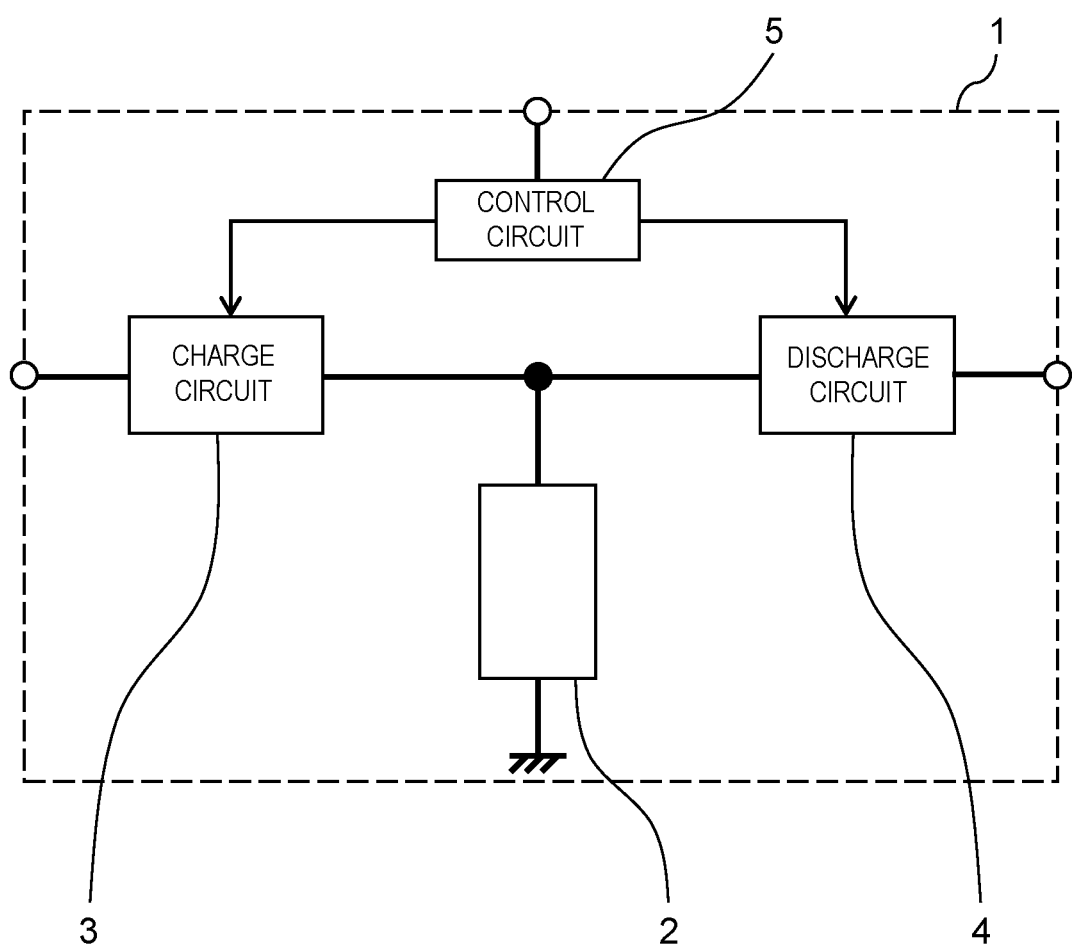
FIG. 5 is a block diagram illustrating a configuration of a conventional power source device.

When a capacitor having a low internal resistance is used as power storage element 2 in power source device 1 illustrated in FIG. 5, for example, power source device 1 can output a large current in a short time even if a capacitance of power storage element 2 is small. However, power source device 1 may have difficulty in continuously supplying electric power over a long period.

If a lead storage battery having a high internal resistance is used as power storage element 2, for example, power source device 1 can output electric power over a long time. However, power storage element 2 needs to have a very large capacitance to output a large current in a short time.

As described above, power source device 1 illustrated in FIG. 5 may have difficulty in supplying a large current over a long period when its capacitance is small.

Figure 3:
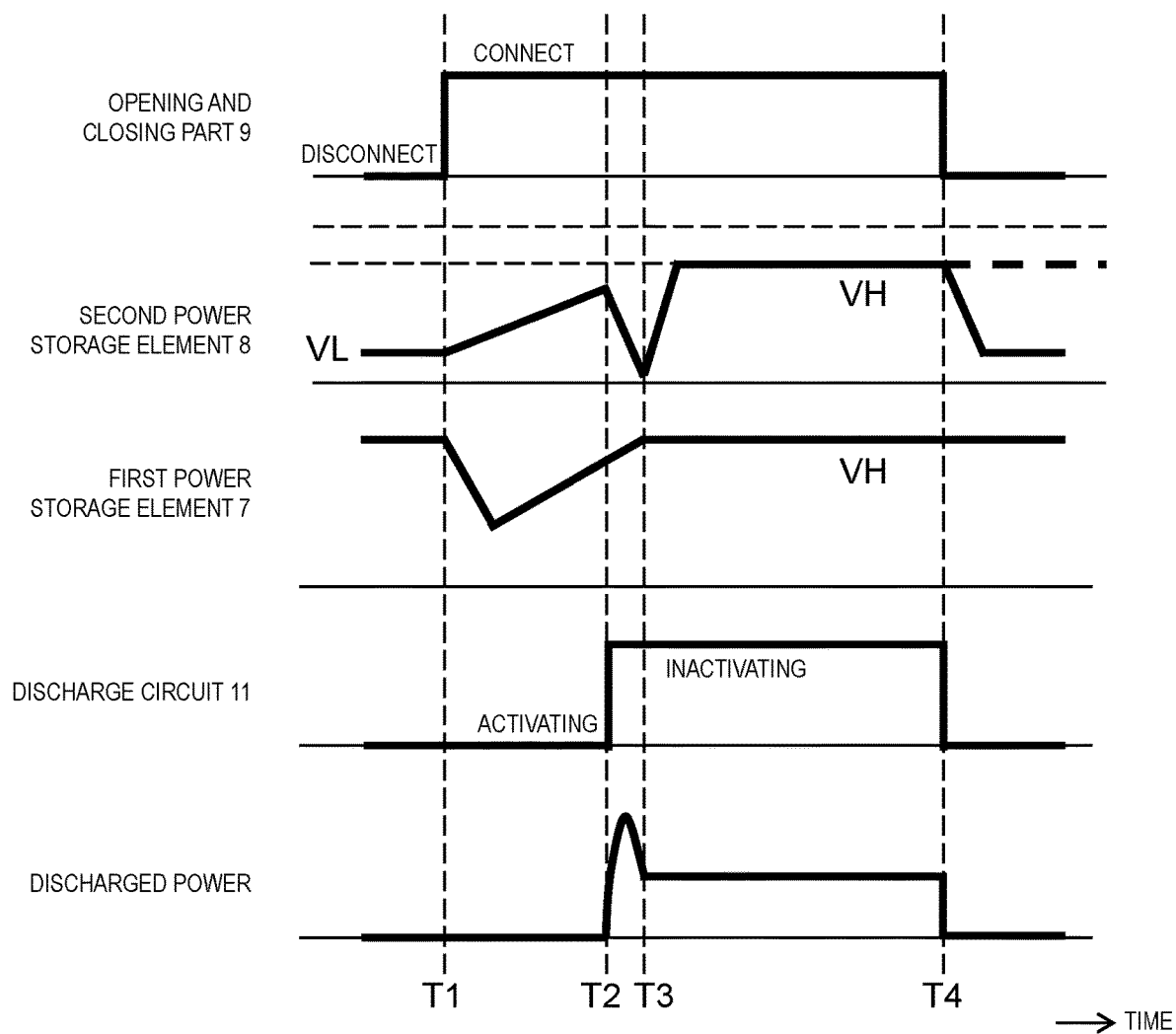
FIG. 3 is a timing chart of an operation performed by the power source device according to the exemplary embodiment of the present disclosure.

Herein, power source device 6 of the present disclosure will be described with reference to FIGS. 1 and 3.

[Configuration of Power Source Device 6]

Figure 1:
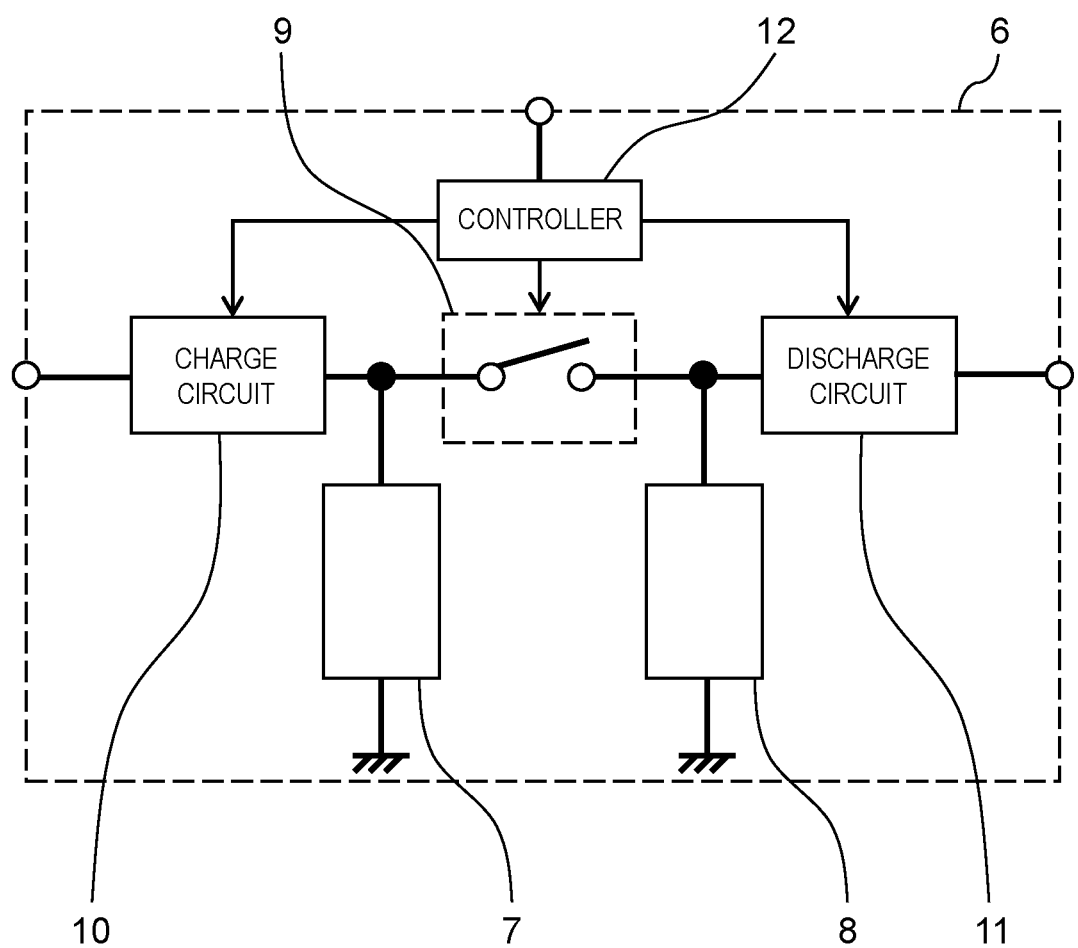
FIG. 1 is a block diagram illustrating a configuration of a power source device according to an exemplary embodiment of the present disclosure.

FIG. 1 is a block diagram illustrating a configuration of a power source device according to a first exemplary embodiment of the present disclosure. Power source device 6 includes: first power storage element 7; second power storage element 8 connected in parallel to first power storage element 7; opening and closing part 9 connected between first power storage element 7 and second power storage element 8; charge circuit 10; discharge circuit 11; and controller 12 that controls operations of opening and closing part 9, charge circuit 10, and discharge circuit 11.

Second power storage element 8 has a lower internal resistance than an internal resistance of first power storage element 7. Furthermore, second power storage element 8 has a lower storage capacity than a storage capacity of first power storage element 7. Opening and closing part 9 performs a switching operation to connect first power storage element 7 and second power storage element 8 to each other or to disconnect first power storage element 7 and second power storage element 8 from each other. Charge circuit 10, which is connected to an input route of first power storage element 7, performs a step-down operation. Discharge circuit 11, which is connected to an output route of second power storage element 8, performs a step-up operation.

When controller 12 controls opening and closing part 9 so as to be in a disconnection state, charge circuit 10 performs the step-down operation to charge first power storage element 7. At this time, discharge circuit 11 is inactivated.

When controller 12 controls opening and closing part 9 so as to be in a connection state, charge circuit 10 is inactivated. In this case, when opening and closing part 9 switches from the disconnection state to the connection state, second power storage element 8 is charged with the electric power stored in first power storage element 7 over a predetermined time. At this time, discharge circuit 11 is inactivated. Then, after the predetermined time has passed since switching of opening and closing part 9 from the disconnection state to the connection state, discharge circuit 11 starts performing the step-up operation. While controller 12 controls opening and closing part 9 so as to be in the connection state, discharge circuit 11 continues to perform the step-up operation. As a result, the electric power stored in both second power storage element 8 and first power storage element 7 is discharged through discharge circuit 11.

According to the above configuration and operation, when power source device 6 needs to supply electric power, second power storage element 8 that has a low internal resistance and thus can discharge a large current in a short time is first charged by first power storage element 7 for a predetermined time, and then discharges the current. When a voltage of second power storage element 8 starts decreasing as a result of the discharging, first power storage element 7 that can discharge a current over a long period replaces second power storage element 8 and starts discharging the electric power. In this way, power source device 6 can output a required amount of electric power over a necessary period.

In other words, in a state where power source device 6 needs to output electric power, controller 12 controls opening and closing part 9, charge circuit 10, and discharge circuit 11 so as to sequentially perform the following operations: second power storage element 8 is charged with electric power; second power storage element 8 discharges the electric power; and first power storage element 7 discharges the electric power.

According to power source device 6 of the present disclosure, power source device 6 outputs electric power stored in second power storage element 8 during an initial discharge period in which a power supply target has a large load. When the load of the power supply target becomes lower after a predetermined time has passed since the start of the discharging, power source device 6 can continuously output the electric power stored in first power storage element 7 over a long period. As a result, power source device 6 can output a required amount of electric power to the power supply target in accordance with situations and can continuously output the electric power.

[Vehicle Equipped with Power Source Device 6]

Next, a description will be given regarding an example case where power source device 6 described above is installed in vehicle 13A.

Figure 2:
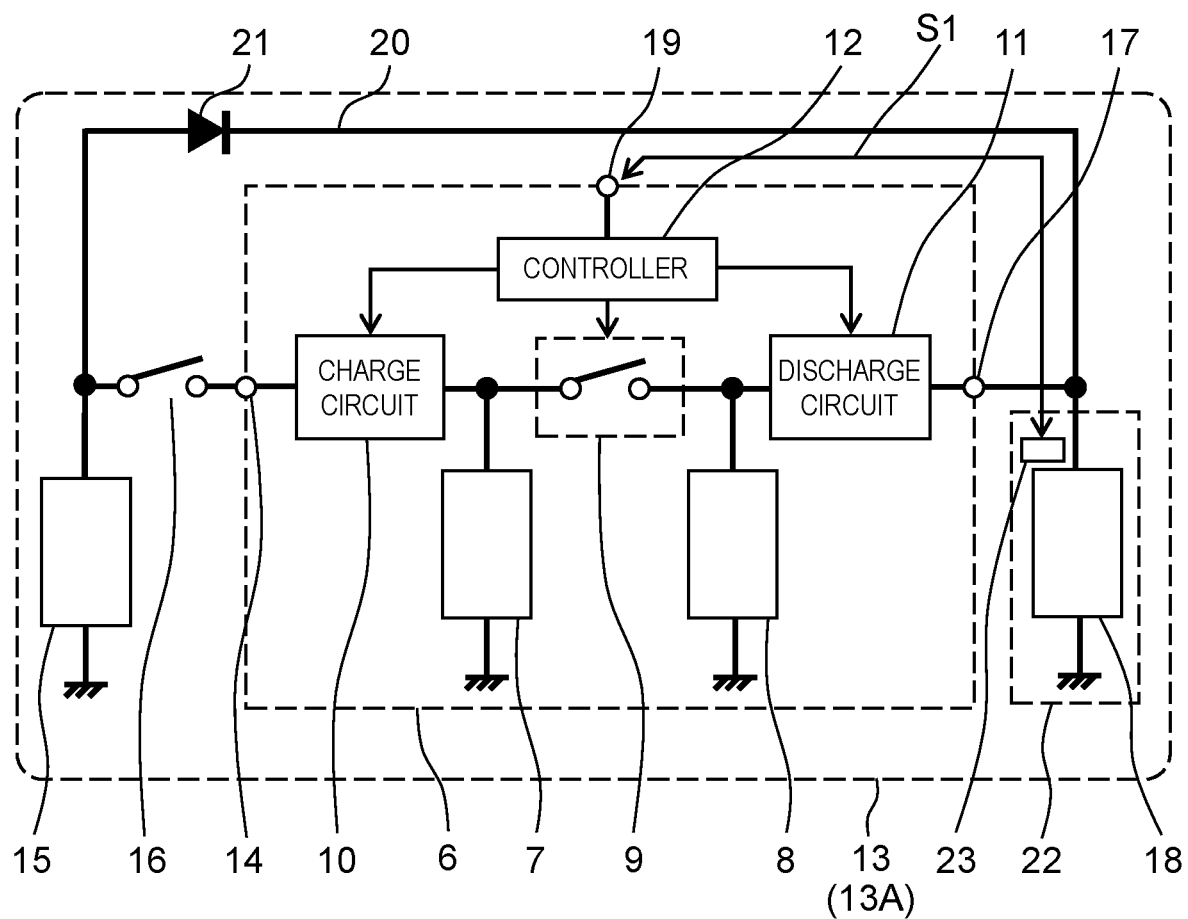
FIG. 2 is a block diagram illustrating a configuration of a vehicle equipped with the power source device according to the exemplary embodiment of the present disclosure.
Figure 4:
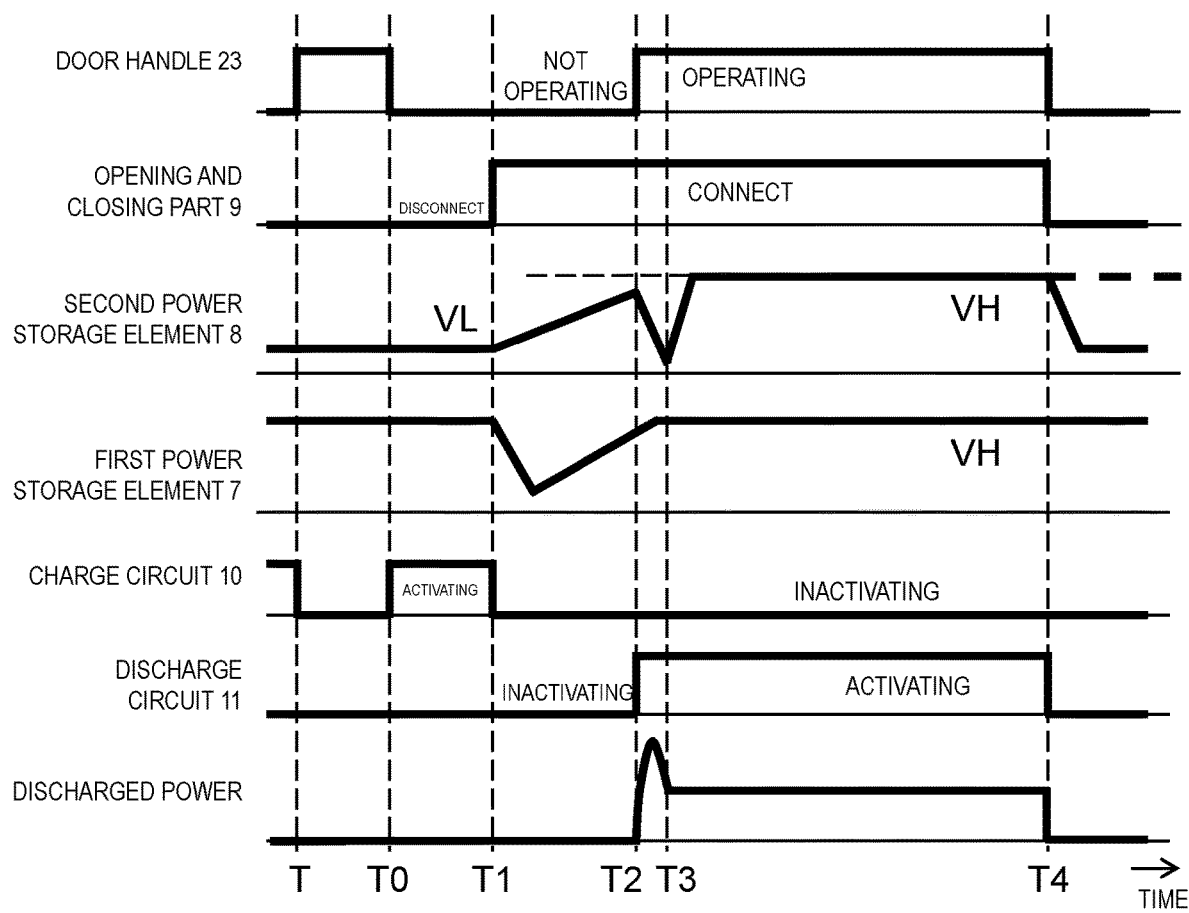
FIG. 4 is a timing chart of an operation performed by the vehicle according to the exemplary embodiment of the present disclosure.

FIG. 2 is a block diagram illustrating a configuration of a vehicle equipped with the power source device according to the first exemplary embodiment of the present disclosure; FIG. 3 is a timing chart of an operation performed by the power source device according to the first exemplary embodiment of present disclosure. FIG. 4 is a timing chart of an operation performed by the vehicle according to the first exemplary embodiment of the present disclosure. The timing chart in FIG. 3 overlaps with the timing chart in FIG. 4; therefore, only the timing chart in FIG. 4 will be described below and the timing chart in FIG. 3 will not be described.

Power source device 6 described above is installed in vehicle body 13. Input terminal 14 of power source device 6 is connected, via engine switch 16, to vehicle battery 15 mounted in vehicle body 13. Output terminal 17 of power source device 6 is connected to vehicle load 18. Control terminal 19 of power source device 6 is connected to controller 12 and receives signals from an outside of power source device 6 and from an inside of vehicle 13A. In a typical case, vehicle battery 15 is connected to vehicle load 18 via power route 20. Disposed on power route 20 is backflow preventing diode 21, which blocks a current from flowing from output terminal 17 to vehicle battery 15.

In this exemplary embodiment, a description will be given regarding an example in which vehicle load 18 is a door latch motor disposed in door 22 that is provided in vehicle body 13 and an operation member for use in outputting an instruction to vehicle load 18 (door latch motor) is door handle 23.

Vehicle load 18 (door latch motor) needs to enable a passenger to get in or out of vehicle 13A, regardless of whether vehicle 13A starts up. Thus, vehicle load 18 is connected to vehicle battery 15 via power route 20. In other words, vehicle load 18 is in a state of being able to receive electric power from vehicle battery 15.

When the passenger inside or outside vehicle 13A attempts to open door 22 by using door handle 23, which is the operation member, disposed in door 22 of vehicle body 13, vehicle battery 15 supplies electric power to vehicle load 18. As a result, vehicle load 18 (door latch motor) is driven, thereby enabling the passenger to open door 22. Simultaneously with the supply of the electric power from vehicle battery 15 to vehicle load 18 through power route 20, vehicle battery 15 may also supply the electric power to power source device 6, and in turn, power source device 6 may supply the electric power to vehicle load 18.

Next, a description will be given of an operation performed by vehicle 13A equipped with power source device 6, with reference to FIGS. 2 and 3. When the passenger inside or outside vehicle 13A attempts to open door 22 of vehicle body 13 by operating door handle 23 disposed in door 22, control terminal 19 receives operation instruction signal S1 generated in response to an instruction of opening door handle 23. A timing when control terminal 19 receives operation instruction signal S1 corresponds to time T1 in the timing chart of FIG. 3. The timing chart of opening and closing part 9 in FIG. 3 indicates whether opening and closing part 9 is in a connection state or in a disconnection state. The state of opening and closing part 9 is switched in response to a passenger's operation of door handle 23. More specifically, in a period before time T1, opening and closing part 9 is in the disconnection state, in other words, in a state where door handle 23 is not operated. When the passenger starts operating door handle 23 (time T1), opening and closing part 9 switches to the connection state. The connection state of opening and closing part 9 is maintained until the passenger finishes operating door handle 23 (time T4).

If vehicle 13A has already started up before time T1, the passenger has not operated door handle 23, and engine switch 16 is in a connection state. When vehicle 13A has started up as in this state, vehicle battery 15 supplies the electric power to charge circuit 10 through both engine switch 16 and input terminal 14. Then, charge circuit 10 is activated to charge first power storage element 7.

Engine switch 16 may be either a switch for use in starting up vehicle 13A or a switch that operates in relation to the start-up of vehicle 13A.

If vehicle body 13 has not started up before time T1, first power storage element 7 is already charged during a charging operation performed when vehicle 13A starts up the last time. As a result, first power storage element 7 is almost constantly maintained in a fully charged state.

First power storage element 7 is preferably an element, such as a capacitor or a lithium battery, that is resistant to deterioration even in a constantly, fully charged state.

Regardless of whether vehicle 13A starts up, controller 12 inactivates charge circuit 10 at time T1 (or maintains charge circuit 10 in an inactive state). As described above, at time T1, controller 12 switches opening and closing part 9 from the disconnection state to the connection state. While opening and closing part 9 is in the connection state, both first power storage element 7 and second power storage element 8 are connected in parallel to discharge circuit 11.

Second power storage element 8 may be an electric double layer capacitor whose internal resistance and storage capacity are lower than the internal resistance and storage capacity, respectively, of first power storage element 7. If second power storage element 8 is an electric double layer capacitor, second power storage element 8 is typically maintained in an uncharged state or in a state of being charged at a voltage value lower than a threshold, in order to avoid deterioration of second power storage element 8. For this purpose, before time T1, second power storage element 8 is set to a state of being charged at voltage VL, which is lower than or equal to the threshold. When opening and closing part 9 enters the connection state at time T1, first power storage element 7 is connected in parallel to second power storage element 8. As a result, second power storage element 8 is charged until second power storage element 8 and first power storage element 7 have the same potential, so that the voltage of second power storage element 8 increases.

Immediately after time T1, first power storage element 7 enters a state of supplying the electric power to second power storage element 8. Therefore, the voltage of first power storage element 7 decreases temporarily in a very short period. Then, the voltage of first power storage element 7 returns to voltage VII, which is substantially equal to the initial charged voltage. A reason why first power storage element 7 can supply the electric power to second power storage element 8 immediately after time T1 is that the storage capacity of first power storage element 7 is set to be higher than the storage capacity of second power storage element 8. After that, the voltage variation is very slightly continued.

At time T2, which is a time point when a predetermined time has passed since time T1, discharge circuit 11 is activated. Since second power storage element 8 has already been charged by first power storage element 7 at time T2, the voltage of second power storage element 8 has a value equal to or close to charged voltage VH, which is the initially charged voltage of first power storage element 7. In this case, discharge circuit 11 is activated at time T2, which is the time point when the predetermined time has passed after time T1.

In order for discharge circuit 11 to operate precisely, controller 12, charge circuit 10, or discharge circuit 11 may detect a voltage of second power storage element 8 and, at time T2, which is a time point when the detected voltage reaches or exceeds a predetermined value, controller 12 may activate discharge circuit 11.

When discharge circuit 11 is activated at time T2, first power storage element 7 and second power storage element 8 that have been interconnected in parallel are at substantially the same potential. In this case, both of first power storage element 7 and second power storage element 8 would supply the electric power to discharge circuit 11. However, as described above, the internal resistance of second power storage element 8 is smaller than the internal resistance of first power storage element 7, and a wire between second power storage element 8 and discharge circuit 11 is shorter than a wire between first power storage element 7 and discharge circuit 11. Assuming that both wires have the same width, a conductor resistance present between discharge circuit 11 and second power storage element 8 is lower than a conductor resistance present between discharge circuit 11 and first power storage element 7. Therefore, immediately after discharge circuit 11 is activated, discharge circuit 11 acquires the electric power stored in second power storage element 8 in a short time, in preference to the electric power stored in first power storage element 7, and then increases a voltage. As a result, discharge circuit 11 supplies a large current, namely, high electric power to vehicle load 18 through output terminal 17 in a short time between times T2 and T3.

Since discharge circuit 11 acquires the electric power stored in second power storage element 8 in the short time in preference to the electric power stored in first power storage element 7, the voltage of second power storage element 8 temporarily decreases over a period between times T2 and T3. However, immediately after time T3, the voltage of second power storage element 8 increases to voltage VII, which is the initially charged voltage of first power storage element 7 or to a value close to voltage VII, because first power storage element 7 is connected in parallel to second power storage element 8 via opening and closing part 9.

When the electric power stored in second power storage element 8 decreases to a very low value at time T3, discharge circuit 11 in turn acquires the electric power stored in first power storage element 7 and then steps up a voltage. As a result, discharge circuit 11 supplies the electric power stored in first power storage element 7 to vehicle load 18 via output terminal 17 over a period between times T3 and T4. Discharge circuit 11 may have difficulty in outputting the electric power stored in first power storage element 7 in a form of an instantly large current, but can output a constant current over a long time. This enables discharge circuit 11 to continuously supply the electric power to vehicle load 18 through output terminal 17. It should be noted that, over the period between times T3 and T4, the charging of second power storage element 8 with electric power from first power storage element 7 and supplying the electric power from first power storage element 7 to discharge circuit 11 is performed simultaneously.

At time T4, which is a time point when the passenger finishes operating door handle 23, controller 12 switches opening and closing part 9 from the connection state to the disconnection state. Simultaneously, controller 12 inactivates discharge circuit 11. In response, discharge circuit 11 stops discharging the electric power to vehicle load 18 through output terminal 17. As described above, first power storage element 7 is constantly maintained in the almost fully charged state. Thus, even after time T4, first power storage element 7 is maintained in the almost fully charged state.

After time T4, second power storage element 8 discharges the electric power for the sake of an extended lifetime, so that the voltage of second power storage element 8 returns to voltage VL, which is the initial voltage. A state where second power storage element 8 discharges the electric power is depicted after time T4 by a solid line in FIG. 4. A state where second power storage element 8 does not discharge the electric power is depicted by a broken line. For example, a discharger (not illustrated) may be used to decrease the charged voltage of second power storage element 8 to voltage VL or lower.

As is clear from the state of the discharged electric power illustrated in FIG. 4, discharge circuit 11 in vehicle 13A can supply high electric power to vehicle load 18 immediately after starting the power supply, and then can continuously supply vehicle load 18 with electric power lower than the initial electric power. Vehicle load 18 needs high electric power in an initial operation, especially if vehicle load 18 is a motor. However, when continuing to operate, the motor does not need as high electric power as the initial electric power. Therefore, vehicle 13A equipped with power source device 6 according to the present disclosure enables the passenger to perform an open operation of door handle 23 over a long time.

Vehicle 13A of the present disclosure can supply electric power from both of discharge circuit 11 and power route 20 to vehicle load 18. Even if vehicle battery 15 deteriorates with its voltage decreasing, vehicle 13A can drive vehicle load 18 until the electric power stored in first power storage element 7 runs out.

Even if first power storage element 7 and second power storage element 8 deteriorate, vehicle battery 15 can drive vehicle load 18 through power route 20.

As described above, vehicle 13A is equipped with power source device 6 that can constantly supply the electric power to vehicle load 18.

Second Exemplary Embodiment

Next, with reference to FIGS. 2 and 4, a description will be given of vehicle 13A in which power source device 6 can supply electric power to vehicle load 18 in an emergency, such as in a case where vehicle body 13 or vehicle 13A is damaged by, for example, an accident.

It should be noted that, although the block diagram in FIG. 2 is also applicable to second exemplary embodiment, the second exemplary embodiment differs from first exemplary embodiment only in function of controller 12 or charge circuit 10.

Controller 12 determines whether vehicle body 13 and vehicle 13A are in a normal state or an abnormal state. To perform a method of determining whether vehicle body 13 and vehicle 13A are in a normal state or an abnormal state, in the second exemplary embodiment, controller 12 or charge circuit 10 detects a voltage at input terminal 14 and makes the determination during the start-up of vehicle 13A.

When vehicle 13A starts up, vehicle battery 15 supplies electric power to input terminal 14 of power source device 6 through engine switch 16 being in a connection state. If vehicle 13A is involved in an accident, for example, and vehicle body 13 or vehicle battery 15 is thereby damaged, the voltage at input terminal 14 may decrease. Thus, when engine switch 16 is in the connection state, if the voltage at input terminal 14 decreases to less than a predetermined value, controller 12 or charge circuit 10 may determine that vehicle 13A and vehicle body 13 are in an emergency state due to an accident. The determination as to an accident of vehicle 13A and vehicle body 13 may be made in consideration of detection using a crash sensor (not illustrated) provided in vehicle body 13.

Needless to say, when engine switch 16 is in the connection state, if the voltage at input terminal 14 is kept at a voltage higher than the predetermined value, controller 12 or charge circuit 10 may determine that vehicle 13A and vehicle body 13 are in a normal state.

<Normal State>

First, a description will be given regarding a case where vehicle 13A and vehicle body 13 are determined to be in the normal state. In this state, vehicle battery 15 can supply the electric power to vehicle load 18 through power route 20. Accordingly, opening and closing part 9 in power source device 6 is constantly in the disconnection state, regardless of whether control terminal 19 receives (or does not receive) operation instruction signal S1 generated in response to an instruction of opening door handle 23.

The state where vehicle 13A and vehicle body 13 are determined to be in the normal state corresponds to a period before time T1 in the timing chart of FIG. 4. Then, over a period between times T and T0, which corresponds to a period in which door handle 23 is operated, vehicle battery 15 drives vehicle load 18 through power route 20.

In the state where vehicle 13A and vehicle body 13 are determined to be in the normal state, charge circuit 10 in power source device 6 charges first power storage element 7 with the electric power from vehicle battery 15, in order to prepare for an abnormal state where vehicle battery 15 loses the electric power.

A period in which charge circuit 10 charges first power storage element 7, which corresponds to the period between times T0 and T1 indicated by the word "activation" in FIG. 4 is depicted as continuous, constant charging in FIG. 4. However, this period may be intermittent charging in which charging periods and break periods are alternately set at predetermined intervals.

Even if vehicle 13A and vehicle body 13 are determined to be in the normal state, charge circuit 10 stops charging over a period in which the passenger or another person operates door handle 23 (over the period between times T and T0). This is to reduce an increase in a burden on vehicle battery 15, which may be caused by the supply of the electric power from vehicle battery 15 to both charge circuit 10 and vehicle load 18.

<Abnormal State (First Example)>

A description will be given regarding a case where vehicle 13A and vehicle body 13 are determined to be in the abnormal state. In this state, vehicle battery 15 cannot supply the electric power to vehicle load 18 or the power source device. As described above, when engine switch 16 is in the connection state, if the voltage at input terminal 14 decreases to less than the predetermined value, controller 12 or charge circuit 10 determines that vehicle 13A and vehicle body 13 are in the emergency state due to an accident. In the timing chart of FIG. 4, at time T1, controller 12 determines that vehicle 13A and vehicle body 13 are in the abnormal state. A period after time T1 corresponds to a period in which the abnormal state is continued.

When vehicle 13A and vehicle body 13 are determined to be in the abnormal state, charge circuit 10 stops charging first power storage element 7 which has been performed in a continuous or intermittent manner. Then, at the same time when or immediately after charge circuit 10 stops charging, opening and closing part 9 switches from the disconnection state to the connection state. The operations performed by charge circuit 10 and opening and closing part 9 are controlled by controller 12. During the period after time T1, controller 12 continues to operate in order to maintain a state of being able to receive operation instruction signal S1 through control terminal 19. In this case, controller 12 may cause first power storage element 7 to act as a power source. Since controller 12 consumes only a small amount of electric power, the amount of electric power stored in first power storage element 7 does not greatly decrease.

In general, when vehicle 13A and vehicle body 13 are involved in an accident at time T1, the period between times T1 and T2, in which the passenger or a rescuer operates door handle 23, becomes longer than usual. By being connected to first power storage element 7, second power storage element 8 that has been insufficiently charged until time T1 is charged. In this case, in order to reserve a time for charging second power storage element 8, a predetermined period may be set within the period between times T1 and T2 as a period for prohibiting an operation of door handle 23. However, the period for prohibiting an operation of door handle 23 does not necessarily have to be set, because first power storage element 7, in fact, can charge second power storage element 8 in only about 10 seconds.

Immediately after time T1, first power storage element 7 enters a state of supplying the electric power to second power storage element 8. Therefore, the voltage of first power storage element 7 temporarily decreases in a very short period and then returns to voltage VII, which is substantially equal to an initial charged voltage. This is because a storage capacity of first power storage element 7 is set to be higher than a storage capacity of second power storage element 8. After that, the voltage continues to slightly vary. This behavior is similar to the behavior in the first exemplary embodiment described above.

In response to the passenger or rescuer's operation of door handle 23 at time T2, operation instruction signal S1 is transmitted to control terminal 19. In response, discharge circuit 11 discharges the electric power from both second power storage element 8 and first power storage element 7. Vehicle load 18 is driven by means of the electric power supplied from discharge circuit 11 through output terminal 17. When vehicle 13A and vehicle body 13 are determined to be in the abnormal state, opening and closing part 9 that has switched from the disconnection state to the connection state at time T1 maintains the connection state in which power source device 6 can supply the electric power to vehicle load 18, until time T4 at which the passenger or the rescuer finishes operating door handle 23.

In the second exemplary embodiment, over the period between times T3 and T4, first power storage element 7 charges second power storage element 8. Simultaneously and in parallel with this, first power storage element 7 supplies the electric power to discharge circuit 11. This operation is similar to the operation in the first exemplary embodiment.

In the second exemplary embodiment, after time T4, discharge circuit 11 no longer has to discharge the electric power stored in second power storage element 8 and thus may simply maintain the electric power in second power storage element 8 (this state is depicted by a broken line in FIG. 4). This is because power source device 6 needs to operate under a special condition, more specifically, in an emergency situation where vehicle body 13 is involved in an accident. In this way, power loss of second power storage element 8 is reduced, which enables power source device 6 to operate in a much longer period after time T4.

Power source device 6 can repeat the operation that has been performed over the period between times T1 and T4 multiple times, especially when vehicle 13A is involved in an accident. This is because first power storage element 7 is a capacitor or lithium battery that is resistant to deterioration even in a constantly, fully charged state. If a capacitor or lithium battery that is resistant to deterioration is used, power source device 6 can continuously or repeatedly discharge the electric power. Thus, over the period between times T1 and T2, which is within the period between times T1 and T4 that repeatedly appears, first power storage element 7 may repeat charging second power storage element 8.

When controller 12 determines that vehicle 13A (vehicle body 13) is in the abnormal state due to an accident and thereby repeats the above operation that has been performed in the period between times T1 and T4, charge circuit 10 does not have to operate in a period between time T4 and next time T1 even if opening and closing part 9 is in the disconnection state. A reason is that, when controller 12 is determined to be in the abnormal state, vehicle battery 15 that is to supply the electric power to charge circuit 10 can no longer supply the electric power. Thus, the operation performed by charge circuit 10 is unnecessary. In order to avoid wasting the electric power in an unnecessary operation, controller 12 inactivates charge circuit 10 even if opening and closing part 9 is in the disconnection state.

As a result of the above, the passenger of vehicle 13A can repeatedly attempt to escape from vehicle 13A multiple times after an accident occurs. Likewise, the rescuer of vehicle 13A can repeatedly attempt to rescue the passenger in vehicle body 13 multiple times. When first power storage element 7 is a capacitor or lithium battery that is resistant to deterioration even in a constantly, fully charged state, first power storage element 7 does not spontaneously discharge the electric power for about 100 hours. Therefore, even if the passenger cannot escape from vehicle 13A on his/her own and the rescuer needs time to reach vehicle 13A, power source device 6 can maintain the electric power, especially stored in first power storage element 7 until the passenger is rescued and thereby can operate at necessary opportunities.

As indicated by a curve of discharged power in the timing chart of FIG. 4, discharge circuit 11 can initially supply high electric power to vehicle load 18 and then can continuously supply electric power lower than the initial electric power to vehicle load 18. Therefore, in an emergency case where vehicle 13A is involved in an accident, discharge circuit 11 can simultaneously activate a plurality of vehicle loads 18 that require large currents for activation. For example, when the passenger or the rescuer operates door handle 23 during the process described above, only if vehicle 13A is determined to be involved in an accident, discharge circuit 11 may drive door latch motors (vehicle loads 18) so as to open all doors 22, in response to an operation of one of door handles 23 in respective doors 22 provided in vehicle body 13.

Only if vehicle 13A is determined to be involved in an accident, when discharge circuit 11 first outputs the electric power, power source device 6 may simultaneously drive the door latch motors as vehicle loads 18 and door lock release motors by means of the electric power.

In the exemplary embodiments described herein, a case where vehicle load 18 is a door latch motor has been used by way of example. Power source device 6 of present disclosure effectively serves as an emergency power source for vehicle load 18 when vehicle 13A is determined to be involved in an accident, because vehicle load 18, which may be a motor, requires a large current to produce high torque upon startup but, when continuing to operate, can maintain its operation by receiving a constant current.

The above example has described a procedure of the operation performed by power source device 6 when vehicle 13A is determined to be involved in an accident, in response to an occurrence of an event where engine switch 16 is in the connection state but the voltage at input terminal 14 is lower than the predetermined value, or in response to a detection of the crash sensor.

<Abnormal State (Second Example)>

One example of other abnormal states is a case where submersion of vehicle body 13 is detected. In this case, power source device 6 may perform the operation starting from time T1 without receiving a passenger's operation, thereby forcedly opening power windows provided in doors 22 as vehicle loads 18. Alternatively, power source device 6 may open the power window in response to a passenger's operation of a window opening and closing instruction unit as an operation unit. If a motor for the power window is used in each door 22 as vehicle load 18, in general, the motor requires a large current upon startup but, when continuing to operate, can maintain its operation by receiving a constant current. Therefore, discharge circuit 11 can supply high electric power to vehicle load 18 in an initial state of start of discharge and then can continuously supply electric power lower than the initial electric power. In this way, power source device 6 of the present disclosure can reliably drive the power windows, namely, vehicle loads 18.

Power source device 6 of the present disclosure can supply the electric power to an outside of power source device 6 in an emergency case where the electric power of a main battery (vehicle battery 15) is lost. When power source device 6 needs to supply electric power to the outside, second power storage element 8 that has a low internal resistance and thus can discharge a large current in a short time is first charged, and then the electric power is discharged to the outside. After second power storage element 8 discharges the electric power, first power storage element 7 that can discharge the electric power over a long period, in turn, starts discharging the electric power. In this way, power source device 6 can supply a required amount of electric power over a necessary period. Consequently, power source device 6 of present disclosure can drive various loads.

Power source device 6 of the above exemplary embodiments is provided with, as an independent internal component in power source device 6, controller 12 that controls opening and closing part 9, charge circuit 10, and discharge circuit 11. However, controller 12 does not necessarily have to be formed as a single circuit block. Alternatively, functions of controller 12 may be fulfilled by power source device 6 or may be separately provided in other components.

Controller 12 may be provided as a part of a vehicle controller (not illustrated) that controls entire vehicle 13A. In this case, both controller 12 and control terminal 19 in the block diagrams only have to fulfill a function of a transceiver circuit that transmits or receives signals between the above vehicle controller and power source device 6.

SUMMARY

The power source device 6 of the present disclosure includes: first power storage element 7; second power storage element 8 that is connected in parallel to first power storage element 7 and that has a lower internal resistance than an internal resistance of first power storage element 7 and a lower storage capacity than a storage capacity of first power storage element 7; an opening and closing part 9 that is connected between first power storage element 7 and second power storage element 8 and that switches between a disconnection state and a connection state; charge circuit 10 that is connected to an input route of first power storage element 7 and that performs a step-down operation; discharge circuit 11 that is connected to an output route of second power storage element 8 and that performs a step-up operation; and controller 12 that controls operations of opening and closing part 9, charge circuit 10, and discharge circuit 11. When opening and closing part 9 is in the disconnection state, first power storage element 7 is disconnected from second power storage element 8, charge circuit 10 performs the step-down operation to charge first power storage element 7, and discharge circuit 11 stops operating. Discharge circuit 11 stops operating over a predetermined time after opening and closing part 9 has switched from the disconnection state to the connection state. After the predetermined time has passed since switching of opening and closing part 9 from the disconnection state to the connection state, discharge circuit 11 starts the step-up operation to discharge electric power stored in second power storage element 8 and first power storage element 7.

In power source device 6 of the present disclosure, first power storage element 7 preferably charges second power storage element 8 over the predetermined time after opening and closing part 9 has switched from the disconnection state to the connection state.

In power source device 6 of the present disclosure, charge circuit 10 preferably stops operating when opening and closing part 9 is in the connection state.

In power source device 6 of the present disclosure, a conductor resistance between discharge circuit 11 and second power storage element 8 is preferably set to be lower than a conductor resistance between discharge circuit 11 and first power storage element 7.

Vehicle 13A equipped with power source device 6, described above, of the present disclosure includes: vehicle body 13; vehicle battery 15 disposed in vehicle body 13; door 22 disposed in vehicle body 13; door handle 23 (operation member) disposed in a door, power source device 6; engine switch 16 connected between vehicle battery 15 and input terminal 14 of charge circuit 10; power route 20 that connects vehicle battery 15 to output terminal 17 of discharge circuit 11; and vehicle load 18 that is disposed in vehicle body 13 and that is connected to output terminal 17. In response to an operation of door handle 23, controller 12 preferably switches opening and closing part 9 from the disconnection state to the connection state. After a predetermined time has passed since switching of opening and closing part 9 from the disconnection state to the connection state, discharge circuit 11 starts the step-up operation to supply vehicle load 18 with electric power stored in second power storage element 8 and first power storage element 7.

In vehicle 13A of the present disclosure, controller 12 or charge circuit 10 preferably can determine whether vehicle body 13 is in a normal state or in abnormal state. When vehicle body 13 is determined to be in the abnormal state and door handle 23 is operated, controller 12 sets opening and closing part 9 to the connection state, and discharge circuit 11 performs the step-up operation to discharge the electric power stored in second power storage element 8 and first power storage element 7. The electric power is thereby supplied from discharge circuit 11 to vehicle load 18.

INDUSTRIAL APPLICABILITY

The power source device of the present disclosure can supply a required amount of electric power over a necessary period, thereby successfully driving various loads. Therefore, the power source device of the present disclosure is effectively applicable to various vehicular electronic devices.

REFERENCE MARKS IN THE DRAWINGS

1,6: power source device
3, 10: charge circuit
4, 11: discharge circuit
5: control circuit
7: first power storage element
8: second power storage element
9: opening and closing part
12: controller
13: vehicle body
13A: vehicle
14: input terminal
15: vehicle battery
16: engine switch
17: output terminal
18: vehicle load
19: control terminal
20: power route
21: backflow preventing diode
22: door
23: door handle
S1: operation instruction signal

The invention claimed is:

1. A power source device comprising:
a first power storage element;
a second power storage element that is connected in parallel to the first power storage element, the second power storage element having a lower internal resistance than an internal resistance of the first power storage element and a lower storage capacity than a storage capacity of the first power storage element;
an opening and closing part that is connected between the first power storage element and the second power storage element, the opening and closing part switching between a disconnection state and a connection state;
a charge circuit that is connected to an input route of the first power storage element, the charge circuit performing a step-down operation;
a discharge circuit that is connected to an output route of the second power storage element, the discharge circuit performing a step-up operation; and
a controller that controls operations of the opening and closing part, the charge circuit, and the discharge circuit,
wherein when the opening and closing part is in the disconnection state, the first power storage element is disconnected from the second power storage element, the charge circuit performs the step-down operation to charge the first power storage element, and the discharge circuit stops operating,
the discharge circuit stops operating over a predetermined time after the opening and closing part has switched from the disconnection state to the connection state, and
after the predetermined time has passed since switching of the opening and closing part from the disconnection state to the connection state, the discharge circuit starts the step-up operation to discharge electric power stored in the second power storage element and the first power storage element.

2. The power source device according to claim 1, wherein the first power storage element charges the second power storage element over the predetermined time after the opening and closing part has switched from the disconnection state to the connection state.

3. The power source device according to claim 1, wherein when the opening and closing part is in the connection state, the charge circuit stops operating.

4. The power source device according to claim 1, wherein a conductor resistance between the discharge circuit and the second power storage element is set to be lower than a conductor resistance between the discharge circuit and the first power storage element.

5. A vehicle comprising:
a vehicle body;
a vehicle battery disposed in the vehicle body;
a door disposed in the vehicle body;
an operation member disposed in the door;
a power source device that includes a first power storage element, a second power storage element that is connected in parallel to the first power storage element and that has a lower internal resistance than an internal resistance of the first power storage element and a lower storage capacity than a storage capacity of the first power storage element, an opening and closing part that is connected between the first power storage element and the second power storage element and that switches between a disconnection state and a connection state, a charge circuit that is connected to an input route of the first power storage element and that performs a step-down operation, a discharge circuit that is connected to an output route of the second power storage element and that performs a step-up operation, and a controller that controls operations of the opening and closing part, the charge circuit, and the discharge circuit, the power source device being disposed in the vehicle body;
an engine switch connected between the vehicle battery and an input end of the charge circuit;
a power route that connects the vehicle battery to an output terminal of the discharge circuit; and
a vehicle load that is disposed in the vehicle body and that is connected to the output terminal,
wherein in response to an operation of the operation member, the controller switches the opening and closing part from the disconnection state to the connection state, and
after a predetermined time has passed since switching of the opening and closing part from the disconnection state to the connection state, the discharge circuit starts the step-up operation to supply the vehicle load with electric power stored in the second power storage element and the first power storage element.

6. The vehicle according to claim 5, wherein
the controller or the charge circuit determines whether the vehicle body is in a normal state or in an abnormal state,
when the vehicle body is determined to be in the abnormal state and the operation member is operated, the controller sets the opening and closing part to the connection state, and the discharge circuit performs the step-up operation to discharge the electric power stored in the second power storage element and the first power storage element, and
the electric power is supplied from the discharge circuit to the vehicle load.

7. The vehicle according to claim 5, wherein the first power storage element charges the second power storage element over the predetermined time after the opening and closing part has switched from the disconnection state to the connection state.

8. The vehicle according to claim 5, wherein when the opening and closing part is in the connection state, the charge circuit stops operating.

9. The vehicle according to claim 5, wherein a conductor resistance between the discharge circuit and the second power storage element is set to be lower than a conductor resistance between the discharge circuit and the first power storage element.

* * * * *